Patented Apr. 9, 1935

1,997,547

UNITED STATES PATENT OFFICE 1,997,547

MANUFACTURE OF HARD RUBBER

Laurence A. Edland, Glen Ridge, N. J., assignor to R. T. Vanderbilt Company, Incorporated, New York, N. Y., a corporation of New York No Drawing. Application June 21, 1933,
Serial No. 676,927

8 Claims. (Cl. 18—53)

This invention relates to the manufacture of hard rubber, and more particularly to the acceleration of the vulcanization of rubber compositions to produce hard rubber, and includes improvements both in the vulcanization process and in the new hard rubber products.

The present invention is based upon the discovery that the vulcanization of rubber with a large percentage of sulfur to make hard rubber or vulcanite can be materially and advantageous accelerated, and improved hard rubber products produced, by adding a small amount of selenium as an accelerator to the rubber-sulfur composition before vulcanization.

In the commercial vulcanization of rubber for the manufacture of soft rubber goods, organic accelerators are extensively used. Such organic accelerators have not, however, found extensive use in the manufacture of hard rubber, and appear to be used only in making cheaper grades of hard rubber. The better grades of hard rubber products are made without the use of an organic accelerator.

In the manufacture of soft rubber goods only a small percentage of sulfur is used, and organic accelerators materially shorten the time and lower the temperature of vulcanization. In the manufacture of hard rubber or vulcanite, however, a high percentage of sulfur is used, in proportion to the rubber, e. g., 35 to 50% of the weight of the rubber, and organic accelerators tend to cause too rapid initial vulcanization or scorching, tend to cause overcuring and to give reduced tensile strength in the hard rubber, and tend to cause porosity in the product and surface markings or pock marks, due to liberation of considerable quantities of gas during the vulcanization. Many organic accelerators also cause discoloration of the surface of the hard rubber products. While organic accelerators materially promote the formation of soft rubber, many of them do not accelerate the hard rubber reaction, while those which do quicken the formation of ebonite or hard rubber tend to cause scorching and too rapid initial vulcanization, such that their use is objectionable.

In the preparation of rubber mixes for the manufacture of hard rubber, the rubber is worked mechanically until it becomes plastic enough to take the shape of the mold and to hold the shape when taken from the mold. This mechanical working causes self-heating of the rubber, and, when active organic accelerators are present, together with the large proportion of sulfur present in hard rubber mixes, there is danger of initial vulcanization or setting up of the rubber during mixing, or during storage of the hot rubber after mixing and before molding.

The different action of organic accelerators in the vulcanization of low sulfur mixes to make soft rubber products, and in high sulfur mixes to make hard rubber products, and the important commercial advantages resulting from the use of organic accelerators for making soft rubber goods, as contrasted with the objections to the use of such accelerators in making hard rubber goods, reflects the different natures of the reactions involved in the two cases. In order to produce hard rubber or vulcanite a large proportion of sulfur must be combined with the rubber, and organic accelerators have a different and in many cases a small or negligible effect on the hard rubber reaction as compared with their markedly beneficial accelerating action on the soft rubber vulcanization process.

I have found that, in the manufacture of hard rubber goods, with rubber mixes containing a high percentage of sulfur, the addition of a small amount of selenium markedly accelerates the vulcanization, enables the undesirable results obtained from the use of organic accelerators to be avoided, improves the quality of the product, and, in general, overcomes the objections resulting from the use of organic accelerators, while nevertheless materially promoting and accelerating the vulcanization of the rubber and the production of the hard rubber products.

The amount of selenium used in the present process is only a small percentage of the rubber mix. I have obtained good results with the use of one percent or two percent of selenium on the weight of the rubber used. I have used percentages up to five percent, but that percentage is higher than is ordinarily needed, and the increase in percentage over the use of two percent did not give a proportional improvement in results. The selenium can be used in the form of the finely powdered element, or it may be first mixed with or combined with a part of the sulfur.

The present invention is of more or less general application to the vulcanization of various hard rubber mixtures, including high grade pure rubber products, containing only rubber and sulfur, or with only small amounts of other compounding ingredients, as well as mixtures containing varying amounts of compounding and filling constituents. The proportion of sulfur used will vary with different formulas and compositions but in general will be between 35 and 50% of the weight of the rubber. The empirical formula of hard rubber or ebonite requires about 47 parts by weight of sulfur to 100 parts of rubber, and different formulas approximate more or less closely to this ratio.

I have found that better results are in general obtained, in some respects, from rubber mixes or formulas which are free from zinc oxide, than from corresponding mixes or formulas containing zinc oxide. The presence of zinc oxide tends to promote the formation of pock marks, probably due to the formation of water vapor from the reaction of the zinc oxide during vulcanization. Various inert mineral fillers, hard rubber dust, colored pigments, etc., can be added to the hard rubber formulas to obtain varying results.

The sulfur employed for the vulcanization will ordinarily be added in the elemental form, although some of it may be first combined with the selenium, and some of the sulfur can be added in the form of a polysulfide, such as golden antimony sulfide, with the remainder added in the free state.

I have found that tellurium acts in a similar manner to selenium, but is much less effective and much less advantageous, and is not generally to be recommended.

The invention will be further illustrated by the following examples in which a substantially pure hard rubber formula is used, but it will be understood that the invention is not limited thereto, and that different rubber formulas or mixes can be used, with various fillers, pigments, etc.

The following rubber mixes were compounded, the first representing the blank or control, and the second, third and fourth being made with the addition of 1, 2 and 5% respectively of selenium on the rubber.

|  | 1 | 2 | 3 | 4 |
|---|---|---|---|---|
| Rubber | 100 | 100 | 100 | 100 |
| Cotton seed oil | 2 | 2 | 2 | 2 |
| Plastogen (an activated mineral oil) | 3 | 3 | 3 | 3 |
| Sulfur | 45 | 45 | 45 | 45 |
| Selenium | 0 | 1 | 2 | 5 |

These mixtures were made by mixing in a suitable mixing machine until the mass was plastic enough to take the shape of the mold and to hold the shape when taken out of the mold. The small amount of plastogen used, being an activated mineral oil of a non-volatile character with a marked solvent action on the rubber, reduced materially the time required for plasticizing the rubber, and, when not used, a longer time of working to accomplish plasticization of the rubber will be required. The respective mixtures, after molding, were cured at 149° C. for varying periods of time and the tensile strength, the percent elongation, and the hardness as measured by the Shore durometer were determined. The following results were obtained:

*Tensile and percent elongation cures at 149° C.*

|  | 3 hrs. | 4 hrs. | 6 hrs. | 8 hrs. | 10 hrs. |
|---|---|---|---|---|---|
| 1 |  | 4200—90 | 7450—7 | 7900—6 | 8150—6 |
| 2 | 3470—60 | 7200—7 | 7950—6 | 8000—6 | 8160—6 |
| 3 | 4450—15 | 6900—6 | 8050—6 | 8250—5 | 8250—5 |
| 4 | 7600—6 | 7800—6 | 8120—6 | 8200—6 | 8200—5 |

*Shore hardness at 100° C.*

|  | 3 hrs. | 4 hrs. | 6 hrs. | 8 hrs. | 10 hrs. |
|---|---|---|---|---|---|
| 1 |  |  | 80 | 92 | 95 | 96 |
| 2 |  | 82 | 87 | 94 | 97 | 98 |
| 3 |  | 82 | 87 | 96 | 97 | 98 |
| 4 |  | 86 | 92 | 96 | 97 | 98 |

As compared with the blank or first product, that obtained with the addition of 1% of selenium vulcanized somewhat more rapidly and produced a harder product, while the product obtained with 2% and 5% of selenium showed a much more pronounced acceleration and a more marked improvement in strength. The products were obtained without the drawbacks or objections obtained with organic accelerators such as objectionable scorching, brittleness, pock marking of the surface and porosity due to gas formation, and surface discoloration. The new products were found to have a flat tensile and elongation curve. When the material is cured in tin, the products have a clean surface, and there is no difficulty in stripping the tin from the vulcanized product. The new hard rubber articles remain hard at considerably higher temperatures than do those cured without the use of selenium, which is important for various purposes, for example, in making articles such as grinding wheels.

Tests were made of the plastic mixture, before vulcanizing, by heating them in boiling water at 100° for a period of six hours without showing setting up or curing of the mixtures. The mixtures were in this respect similar to the blank, or mixture made without selenium. Similar tests made by boiling in water, mixtures made without selenium but with the addition of various organic accelerators to the same rubber-sulfur mixture resulted in curing in comparatively short periods of time, indicating objectionable setting up or scorching, such as would take place during prolonged mixing of the rubber and other constituents of the mix during the preliminary plasticizing treatment.

It will thus be seen that the present invention provides an improved method of accelerating the vulcanization of hard rubber mixtures, and the combination of high percentages of sulfur with rubber, to give improved hard rubber products, and that the process and products are free from the objections commonly met with when organic accelerators are employed. The new hard rubber products are characterized by their small content of selenium in a free or combined state, and by the improved properties imparted to the products by the presence of the selenium during the vulcanization process.

I claim:

1. The method of accelerating the vulcanization of hard rubber mixtures containing a high percentage of sulfur sufficient to form hard rubber, which comprises incorporating in the mixture before vulcanization about 1 to 5% of selenium.

2. The method of accelerating the vulcanization of hard rubber mixtures containing about 45% of sulfur based on the rubber, which comprises incorporating in the mixture before vulcanization about 2% of selenium and subjecting the resulting mixture to vulcanization at high temperatures.

3. As new products, vulcanized hard rubber products resulting from the vulcanization of rubber with a high percentage of sulfur and with from 1 to 5% of selenium based on the rubber, the percentage of sulfur being sufficient to form hard rubber products.

4. As new products, vulcanized hard rubber products resulting from the vulcanization of rubber with a high percentage of sulfur and with about 2% of selenium based on the rubber, the percentage of sulfur being sufficient to form hard rubber products.

5. The method of making hard rubber products, which comprises vulcanizing rubber mixtures with a percentage of sulfur sufficient to form hard rubber and with the addition of a sufficient amount of selenium to accelerate the vulcanization but not exceeding about 14% of the sulfur.

6. The method of making hard rubber products, which comprises vulcanizing rubber mixtures with a percentage of sulfur sufficient to form hard rubber and with the addition of a sufficient amount of selenium to accelerate the vulcanization but not exceeding about 5%.

7. The method of accelerating the vulcanization of pure hard rubber mixtures made up mainly of rubber and sulfur and containing a percentage of sulfur sufficient to form hard rubber, which comprises incorporating in the mixture before vulcanization a sufficient amount of selenium to accelerate the vulcanization but not exceeding about 14% of the sulfur.

8. As a new product, vulcanized hard rubber having combined therewith before vulcanization a percentage of sulfur sufficient to form hard rubber and a sufficient amount of selenium to accelerate the vulcanization but not exceeding about 14% of the sulfur.

LAURENCE A. EDLAND.